(12) United States Patent
Lin et al.

(10) Patent No.: US 6,178,011 B1
(45) Date of Patent: Jan. 23, 2001

(54) ADAPTIVE IMAGE RESOLUTION ENHANCEMENT TECHNOLOGY

(75) Inventors: Qian Lin, Santa Clara, CA (US); Brent M. Bradburn, Boise, ID (US); Brian E. Hoffmann, Ranica BG (IT)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/046,995

(22) Filed: Mar. 24, 1998

(51) Int. Cl.[7] .................................................. H04N 1/405
(52) U.S. Cl. ............................................. 358/1.9; 382/237
(58) Field of Search ........................ 358/1.9, 534–536, 358/429; 382/237, 251–252

(56) References Cited

U.S. PATENT DOCUMENTS

| | | | |
|---|---|---|---|
| 4,884,080 | 11/1989 | Hirahara et al. | 346/46 |
| 5,283,664 | 2/1994 | Fujisawa et al. | 358/429 |
| 5,293,430 | * 3/1994 | Shiau et al. | 382/42 |
| 5,327,262 | * 7/1994 | Williams | 358/462 |
| 5,341,226 | * 8/1994 | Shiau | 358/518 |
| 5,550,569 | * 8/1996 | Wright | 347/15 |
| 5,701,366 | 12/1997 | Ostromokhov et al. | 382/237 |
| 5,838,462 | * 11/1998 | Ebner et al. | 358/456 |

FOREIGN PATENT DOCUMENTS

| | | | |
|---|---|---|---|
| 0 348 145 A1 | 6/1989 | (EP) | H04N/1/405 |
| 0 673 150 A2 | 3/1995 | (EP) | H04N/1/405 |
| 96/01451 | 5/1997 | (SE) | H04N/1/40 |

OTHER PUBLICATIONS

European Search Report Application No. EP 99 30 2201, dated July 26, 1999

\* cited by examiner

*Primary Examiner*—Thomas D. Lee
*Assistant Examiner*—Stephen Brinich

(57) ABSTRACT

An Adaptive Image Resolution Enhancement Technology (IRET) process and apparatus is described to improve halftone imaging by changing ordered halftone screen resolution according to the content of the image and managing these changes based on image content. The Adaptive IRET halftoning technique maximizes the artifact reducing properties of coarser ordered screens, while minimizing the loss of rendered detail in image areas having high spatial frequency. IRET may utilize a mixture of any ordered halftone screen (e.g. clustered-dot dither, line screen, etc.) to generate halftone dots with a number of levels, and any dispersed halftone screen to generate additional levels for the ordered halftone dots. For some printing technologies, it is preferable to minimize printing artifacts by generating coarser halftone screens, rather than finer halftone screens. Coarser screening, however, means that details in the image, text, and line art will not be rendered well. Adaptive IRET uses an activity index to change its ordered halftone screen resolution according to the content of the image. To render a page with a mixture of text, line art, area fill, and photograph, it is preferable to render the "busy" areas, such as text, line art, and edge regions in a photograph, with a higher resolution screen. On the other hand, smooth areas, such as area fill and non-edge regions in a photograph, are better rendered with a lower resolution screen.

18 Claims, 4 Drawing Sheets

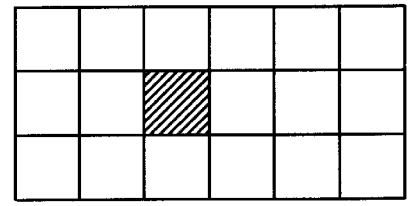
*Figure 3a*  *Figure 3b*
*Figure 4a*
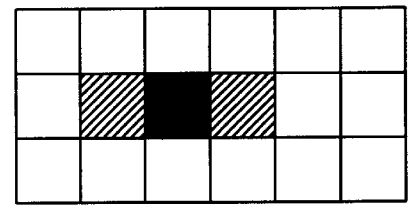
*Figure 4b*
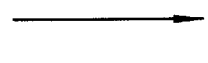
*Figure 4c*

ADAPTIVE IMAGE RESOLUTION ENHANCEMENT TECHNOLOGY

BACKGROUND OF THE INVENTION

1. Field of the Invention

The present invention relates to digital image processing and, more particularly, to processing continuous-tone images into halftone images.

2. Description of the Related Art

Digital Halftoning is the process of transforming a continuous-tone image into a binary image that has the illusion of the original continuous-tone image. See, R. Ulichney, Digital Halftoning, MIT Press, Cambridge, Mass., 1987. In the case of color images, the color continuous-tone image is typically separated into color channels first. Separate halftones are then formed for each of the color channels.

Image Resolution Enhancement Technology (IRET) utilizes a mixture of any ordered halftone screen (e.g. clustered-dot dither, line screen, etc.) to generate halftone dots with a number of levels, and any dispersed halftone screen to generate additional levels for the ordered halftone dots. For some printing technologies, it is preferable to minimize printing artifacts by generating coarser halftone screens, like 150 lpi (lines per inch) rather than finer halftone screens like 600 lpi. Coarser screening, however, means that details in the image, text, and line art will not be rendered well. This is especially a problem in copier applications, where the text and line art are scanned rather than computer generated. For these types of applications, a halftoning technique is required that maximizes the artifact reducing properties of coarser ordered screens, while minimizing the loss of rendered detail in image areas having high spatial frequency.

Thus, it can be seen that halftone imaging techniques impose image quality limits upon halftone image output devices, and hinder the use of these devices in many applications.

Therefore, there is an unresolved need for an image resolution enhancement technique that can improve halftone imaging by changing ordered halftone screen resolution according to the content of the image and managing these changes based on image content.

SUMMARY OF THE INVENTION

An Adaptive Image Resolution Enhancement Technology (IRET) process and apparatus is described to improve halftone imaging by changing ordered halftone screen resolution according to the content of the image and managing these changes based on image content.

The Adaptive IRET halftoning technique maximizes the artifact reducing properties of coarser ordered screens, while minimizing the loss of rendered detail in image areas having high spatial frequency. IRET may utilize a mixture of any ordered halftone screen (e.g. clustered-dot dither, line screen, etc.) to generate halftone dots with a number of levels, and any dispersed halftone screen to generate additional levels for the ordered halftone dots. For some printing technologies, it is preferable to minimize printing artifacts by generating coarser halftone screens, rather than finer halftone screens. Coarser screening, however, means that details in the image, text, and line art will not be rendered well.

Adaptive IRET uses an activity index to change its ordered halftone screen resolution according to the content of the image. To render a page with a mixture of text, line art, area fill, and photograph, it is preferable to render the "busy" areas, such as text, line art, and edge regions in a photograph, with a higher resolution screen. On the other hand, smooth areas, such as area fill and non-edge regions in a photograph, are better rendered with a lower resolution screen.

BRIEF DESCRIPTION OF THE DRAWINGS

The invention will be readily understood by the following detailed description in conjunction with the accompanying drawings, wherein like reference numerals designate like structural elements, and in which:

FIG. 3a is a diagram illustrating an example of a high frequency screen according to an embodiment of the present invention;

FIG. 3b is a diagram illustrating an example of a low frequency screen according to an embodiment of the present invention;

FIG. 4a is a diagram illustrating an example of a look-up table and its corresponding halftone dot for a graylevel of three according to an embodiment of the present invention;

FIG. 4b is a diagram illustrating an example of a look-up table and its corresponding halftone dot for a graylevel of twenty according to an embodiment of the present invention;

FIG. 4c is a diagram illustrating an example of a look-up table and its corresponding halftone dot for a graylevel of 127 according to an embodiment of the present invention;

DETAILED DESCRIPTION OF THE INVENTION

Embodiments of the invention are discussed below with reference to FIGS. 1–6c. Those skilled in the art will readily appreciate that the detailed description given herein with respect to these figures is for explanatory purposes, however, because the invention extends beyond these limited embodiments.

Introduction

The Adaptive Image Resolution Enhancement Technology (IRET) described below is a halftoning technique that maximizes the artifact reducing properties of coarser ordered screens, while minimizing the loss of rendered detail in image areas having high spatial frequency. IRET may utilize a mixture of any ordered halftone screen (e.g. clustered-dot dither, line screen, etc.) to generate halftone dots with a number of levels, and any dispersed halftone screen to generate additional levels for the ordered halftone dots. For some printing technologies, it is preferable to minimize printing artifacts by generating coarser halftone screens, rather than finer halftone screens. Coarser screening, however, means that details in the image, text, and line art will not be rendered well. This is especially a problem in copier applications, where the text and line art are scanned rather than computer generated. However, the Adaptive IRET described below changes its ordered halftone screen resolution according to the content of the image.

Algorithm Description

To render a page with a mixture of text, line art, area fill, and photograph, it is preferable to render the "busy" areas, such as text, line art, and edge regions in a photograph, with a higher resolution screen, such as 600 lpi (lines per inch). On the other hand, smooth areas, such as area fill and non-edge regions in a photograph, are better rendered with a lower resolution screen, such as 150 lpi. We use an activity index to decide which screen will be used.

Figure 1:
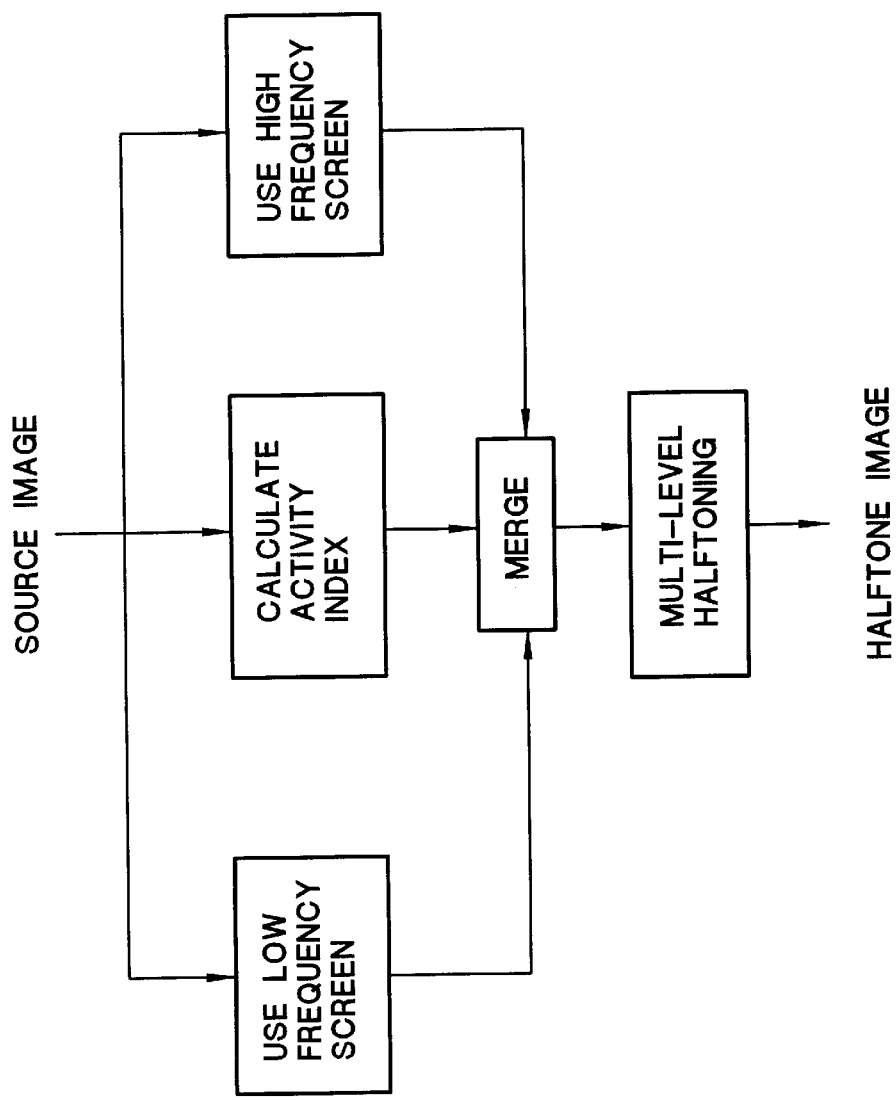
FIG. 1 is a drawing illustrating an adaptive image resolution enhancement technique (IRET) halftoning mechanism for integrating low and high frequency screens according to the present invention.

FIG. 1 is a drawing illustrating an adaptive image resolution enhancement technique (IRET) halftoning mechanism for integrating low and high frequency screens according to the present invention. For this embodiment, the source image 110 is halftoned continuously using a high frequency screen 120 and a low frequency screen 130. For example, the low frequency screen 130 may be a clustered-dot screen which is used for an electrophotographic (EP) printer for stability reasons. The resulting halftone images retain the number of levels in the source image 110, but impart dot structures determined by the halftone screens. The two halftone images are then merged into a single halftone image 140 using a weighted average that depends on the activity index 150. In other words, when the activity index 150 is high, then the output is biased toward the high frequency screen 120. If the activity index is low, then the output is biased toward the low frequency screen 120. Finally, to form the final halftoned image 170, another multi-level halftoning algorithm 160 is applied if the device has a lesser number of levels than the source image 110.

Next, we describe the implementation of each block in more detail.

Activity Index

The activity index can be calculated locally in a small window. One example is to calculate the activity index by taking the difference between neighboring pixels. Suppose the current pixel at position (i,j) is x(i,j), the pixel to the left is x(ij−1), the pixel to the right is x(ij+1), the pixel above is x(i−1,j), and the pixel below is x(i+1,j). Then the activity index a(i,j) can be calculated as $$a(i,j)=|x(ij)-x(ij-1)|+|x(ij)-x(i-1,j)|+|x(ij)-x(i,j+1)|+|x(ij)-x(i+1,j)|$$

Another example of calculating the activity index is to find the largest pixel value max(i,j) and the smallest pixel value min(ij) in a 3×3 window centered on the current pixel (i,j). Then the activity index a(i,j) is calculated as $$a(i,j)=\max(ij)-\min(ij)$$

Once the activity index is calculated, we can select different halftoning screen frequencies based on the activity index.

Figure 2:
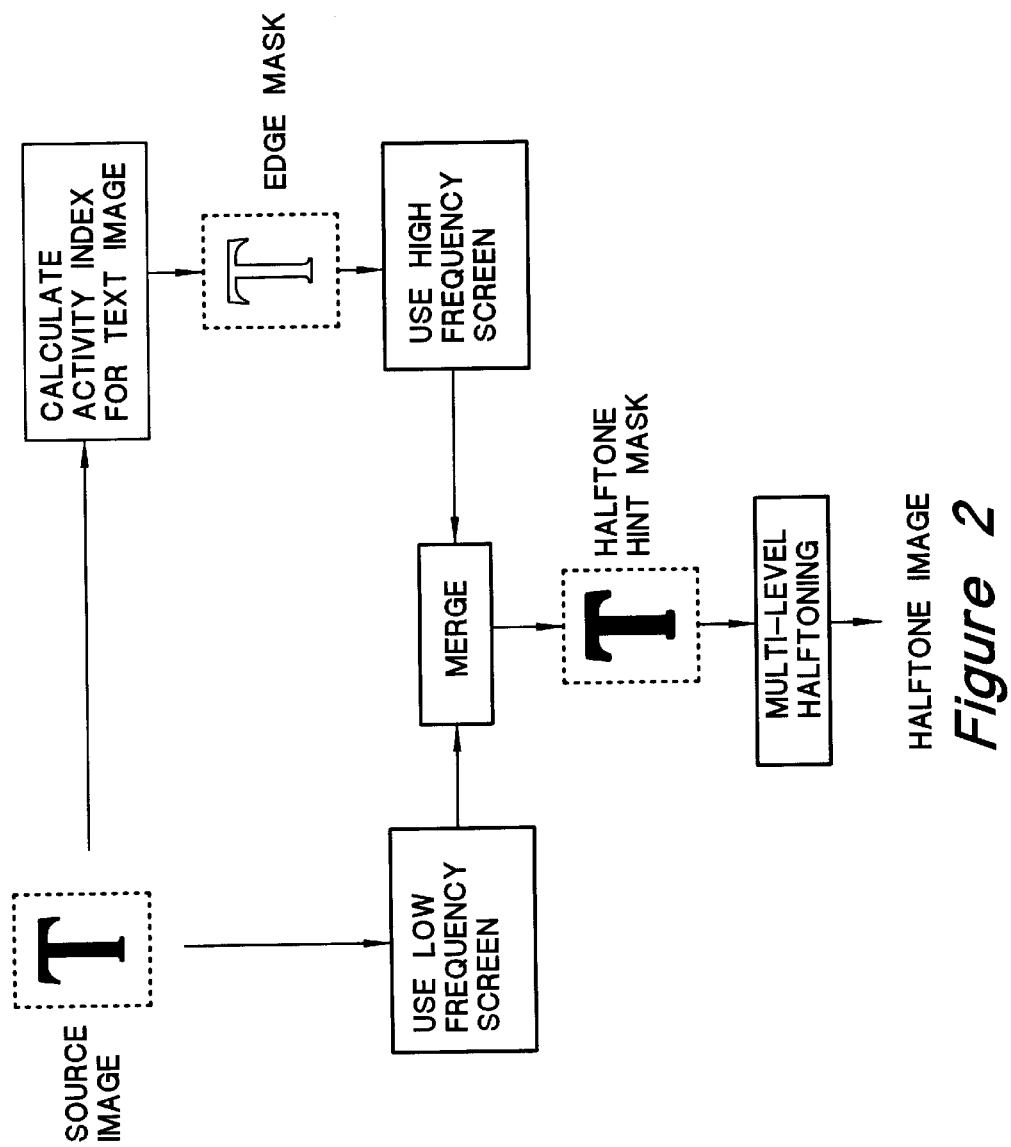
FIG. 2 is a drawing illustrating use of an adaptive IRET for high quality text rendering according to the present invention.

FIG. 2 is a drawing illustrating use of an adaptive IRET for high quality text rendering according to the present invention. For some printing technologies, it is preferable to render the edges of text images at the native resolution of the marking engine, while rendering the interior regions of text images at a lower resolution. The result is generally higher quality text images 210 with significant reduction in print engine artifacts. Adaptive IRET can utilize the activity index computation 250 to distinguish text edges from interior regions and thereby form an edge mask 280. Then, both high and low frequency screens can be applied, with the low frequency screen 230 applied to the text interior and the high frequency screen 220 applied to the text edge. Finally, the merge process 240 can be used to generate a halftone hint mask 290 that can be used to render the text image into precisely two regions: text interior and text edge. Thus, to form the final halftoned image 270, another multi-level halftoning algorithm 260 can be applied if the device has a lesser number of levels than the source image 210.

Halftoning with Low and High Frequency Screens

We will describe two possible ways to impose a screen on a continuous-tone image. However, based upon these examples, one of ordinary skill in the art will be able to apply these teachings to impose a screen on a continuous-tone image according to other known ways to do so.

Dither Matrix Example

The first example we will present is based on dither matrices. However, instead of having a printer dot either turn "on" or "off" (i.e. binary halftoning), it is also possible to turn it "on" partially at any intensity. Suppose two screens (also called dither matrices) are used in the halftoning. One is a $M_t \times M_h$ ($M_h \geq 1$) dither matrix with a high screen frequency. The maximum number of levels halftone dot that the matrix generates is $N_h$ ($N_h \geq 1$). The other screen is a $M_l \times M_l$ ($M_l > 1$) dither matrix with a low screen frequency. The maximum number of levels halftone dot that the matrix generates is $N_l$ ($N_l > 1$). FIGS. 3a and 3b show an example of the high frequency and low frequency screens, 320 and 330, respectively. In the example, $M_h=1$, $M_l=6$, $N_h=1$, and $N_l=18$ with the high frequency screen being 600 lpi at 600 dpi and the low frequency screen being 141 lpi at 600 dpi.

When a high frequency screen is used, suppose the threshold of the high frequency screen at pixel (i,j) is t(i,j). We compare x(i,j) with t(i,j) scaled by $255/N_h$. Let's call the scaled threshold $t_l$. Then $t_l=t(i,j) * 255/N_h$. Let the halftone output be y(i,j). We have $$y(ij)=255 \text{ if } (x(ij) \geq t_l$$

In other words, the pixel at (i,j) is completely turned "on". If (x(i,j)<t(i,j) * L, then we further compare x(i,j) with a second scaled threshold $t_2$. $t_2=(t(ij)-1) * 255/N_h$. We have $$y(i,j)=0 \text{ if } (x(i,j)<t_2$$

In other words, the pixel at (i,j) is completely turned "off". If neither of the above two conditions is satisfied, then the pixel at (ij) is partially turned "on". We have $$y(i,j)=N_h*(x(ij)-t_2) \text{ otherwise}$$

Lookup-table Example

The second implementation is based on look-up tables. For example, to impose a 141 lpi (lines per inch) screen for a 600 dpi (dots per inch) printer, a 3×6 lookup table may be used. Each entry in the lookup table is a value between 0 and 255, with 0 meaning the dot is turned "off", 255 meaning the dot is turned "on", and any value in between meaning the dot is partially turned "on" at an intensity proportional to the value. Examples of the lookup table 410a–c and its corresponding halftone dot 420a–c for several gray levels are shown in FIGS. 4a–c. FIG. 4a illustrates an example of a graylevel of three (=54/18) according to an embodiment of the present invention. Similarly, FIGS. 4b and 4c illustrate examples for a graylevel of twenty (=(255+52+53)/18) and for a graylevel of 127 (=(255 * 9)/18) respectively.

Figure 5:
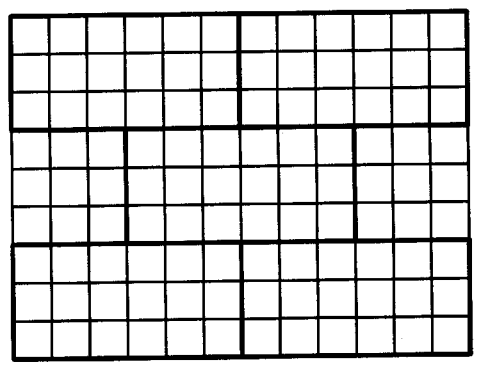
FIG. 5 is a diagram illustrating tiling up of look-up tables according to an embodiment of the present invention.

When a continuous-tone image is halftoned, the 3×6 lookup table 510 may be tiled up as shown in FIG. 5, and the entry from the lookup table with the corresponding gray level is retrieved and put into the resulting image.

Merge

Figure 6A:
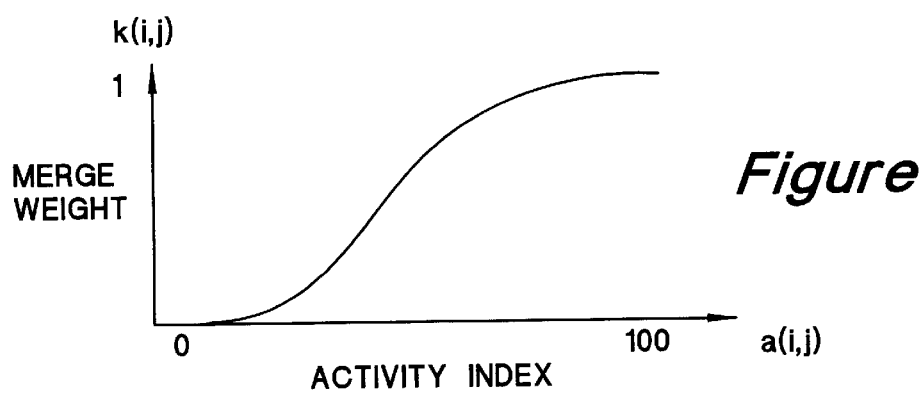
FIG. 6a is a diagram illustrating merge weight as an arbitrary function of activity index according to an embodiment of the present invention.

After we generate an output $Y_h$ (i,j) for input pixel x(i,j) using the high frequency screen, and an output $y_l$(ij) for input pixel x(i,j) using the low frequency screen, we can merge them to generate the final output y(ij) as follows:

$$y(ij)=k(i,j)*y_h(ij)+(1-k(ij))*y_l(i,j)$$

where k(i,j) is a function of the activity index a(i,j), show in FIG. 6a. k(i,j) is between 0 and 1.

Figure 6B:
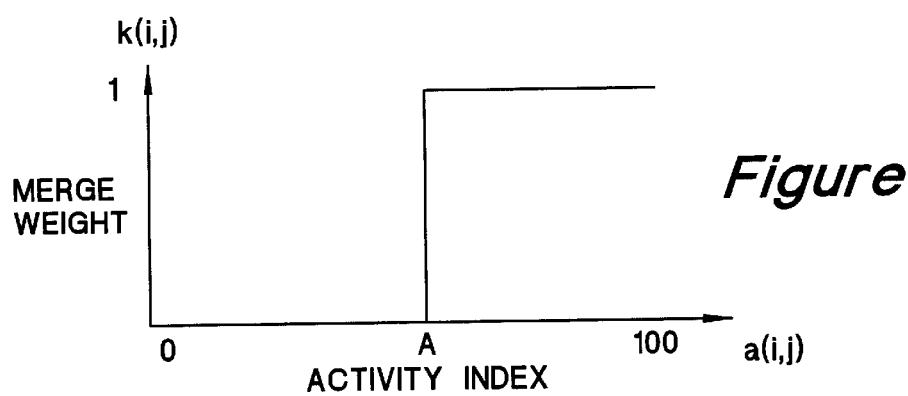
FIG. 6b is a diagram illustrating merge weight as a threshold function of activity index according to an embodiment of the present invention.

An alternate implementation is to compare the activity index with a fixed threshold A, as shown in FIG. 6b. If the activity index is larger than A, then use the high frequency screen. Otherwise, use the low frequency screen.

Figure 6C:
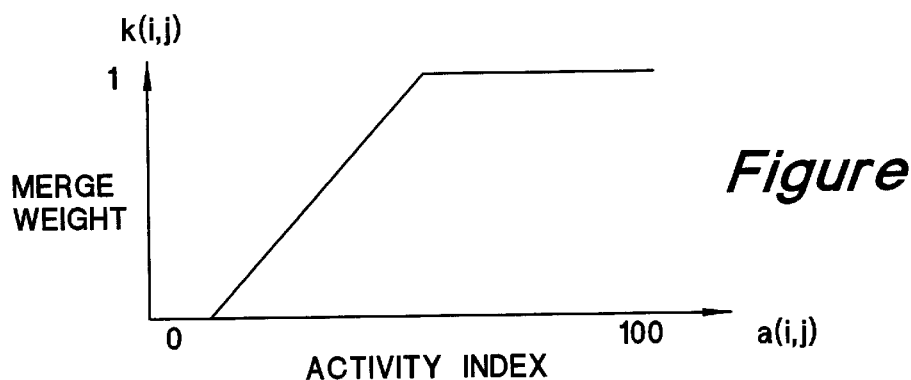
FIG. 6c is a diagram illustrating merge weight as a linear function of activity index according to an embodiment of the present invention.

Instead of choosing either the high frequency screen or the low frequency screen, an alternative implementation is to choose the merge weight k(i,j) to be a linear function of a(i,j), as shown in FIG. 6c. In this case, the high frequency screen and the low frequency screen merge smoothly.

Another implementation alternative is to choose the merge weight k(i,j) to be some arbitrary function of a(ij) that minimizes the imaging artifacts of a specific rendering device or specific printing technology. Adaptive IRET can accommodate any function k(ij) to define the merge weight in order to maximize the rendering quality of a specific rendering technology.

Multi-level Halftoning

Suppose a printer can produce dots with a maximum of L levels of intensity at its highest resolution. This can be achieved, for example, by modulating the laser beam in a laser printer, or by printing multiple dots at the same location in an inkjet printer. We need to reduce the number of levels in the merged halftone, which has the same number of levels as the source image, to L levels. This can be done using a multi-level error diffusion, or a multi-level dither using a scattered-dot dither matrix, similar to the way that Image Resolution Enhancement Technology does. See, for example, Qian Lin, "Printing N-tone Images with Imperceptible Dots", U.S. Pat. No. 5,615,021, issued Mar. 25, 1997; Qian Lin, "Methods to Print N-tone Images with Multi-leveling Techniques", U.S. Pat. No. 5,689,586, issued Nov. 18, 1997; Qian Lin, Brian Hoffmann and Jeff Trask, "Image Resolution Enhancement Technology for a Color Laser Printer", U.S. patent application Ser. No. 08/788,767, filed Jan. 24, 1997.

Halftoning Color Images

The above algorithm can be applied to halftone a color image as well. In that case, we can either calculate the activity index based on the luminance signal of the color image, or calculate the activity index for each color plane (either red, green, and blue, or cyan, magenta, yellow, and black) independently. Then we can halftone each color plane independently with the above algorithm based on the activity index. However, the scattered dot dither matrix and the high and low frequency screens may not be the same for each of the color planes. In fact, it is better to design them jointly. One example of designing the scattered dot dither matrix jointly for the color planes was described in U.S. patent application Ser. No. 08/641,304, filed Dec. 12, 1997, which is entitled "Joint Design of Dither Matrices for a Set of Colorants", and has Jan Allebach and Qian Lin as inventors. This document describes a procedure to design a set of frequency modulated dither matrices to halftone a color image with superior visual quality. The set of dither matrices are computed by minimizing the color fluctuation of constant tone color patches in a uniform color space such as CIELab. Because the dither matrices are pre-computed, it allows efficient implementation in either hardware or software.

One example of designing the clustered-dot screen (either the high frequency screen or the low frequency screen) jointly for the color planes is to design each matrix manually level by level with the help of a visualization program to see how the color halftone dots interact with each other.

Testing and Advantages

The algorithm has been tested on scanned magazine pages and a prototype printer. Result shows that the algorithm can produce sharp text and good image details.

The algorithm is a general halftoning algorithm. Its advantages are most important in two applications. (1) the copier application, where text and line art are scanned and then halftoned. A low frequency screen by itself will yield very jagged (or aliased) edges, while a high frequency screen applied on the whole page will yield printer engine artifacts. (2) computer generated colored text and line art, where the graylevel of the text and line art is not at a full intensity (either 0 or 255). The text and line art again will be jagged if no adaptive IRET is applied.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for halftoning a continuous-tone image to form a halftone image, the process comprising the steps of:
   processing the continuous-tone image using a high frequency halftoning screen to form a high frequency continuously halftoned image;
   processing the continuous-tone image using a low frequency halftoning screen to form a low frequency continuously halftoned image; and
   forming a merged image by merging the high and low frequency continuously halftoned images based upon an activity index related to local change within the continuous-tone image, wherein a merge weight is applied based upon a function of the activity index.

2. The process as set forth in claim 1, wherein at least one of the halftoning screens is a dither matrix.

3. The process as set forth in claim 1, wherein at least one of the halftoning screens is a look-up table.

4. The process as set forth in claim 3, wherein the look-up table is tiled.

5. The process as set forth in claim 1, wherein the merge weight is applied based upon a threshold function of the activity index.

6. The process as set forth in claim 1, wherein the merge weight is applied based upon a linear function of the activity index.

7. The process as set forth in claim 1, comprising the step of multi-level halftoning the merged halftoned image.

8. The process as set forth in claim 1, wherein the continuous-tone image is a color image.

9. A process for halftoning a continuous-tone image to form a halftone image, the process comprising the steps of:
   processing the continuous-tone image using a high frequency halftoning screen to form a high frequency continuously halftoned image;
   processing the continuous-tone image using a low frequency halftoning screen to form a low frequency continuously halftoned image; and
   forming a merged image by merging the high and low frequency continuously halftoned images based upon an activity index related to local change within the continuous-tone image, wherein the activity index is used to form an edge mask and the high and low frequency continuously halftoned images are merged to form a halftone hint mask.

10. A processor for halftoning a continuous-tone image to form a halftone image, the processor comprising:
   high frequency means for processing the continuous-tone image using a high frequency halftoning screen to form a high frequency continuously halftoned image;
   low frequency means for processing the continuous-tone image using a low frequency halftoning screen to form a low frequency continuously halftoned image; and
   merging means for forming a merged image by merging the high and low frequency continuously halftoned images based upon an activity index related to local change within the continuous-tone image, wherein a merge weight is applied based upon a function of the activity index.

11. The processor as set forth in claim 10, wherein at least one of the halftoning screens is a dither matrix.

12. The processor as set forth in claim 10, wherein at least one of the halftoning screens is a look-up table.

13. The processor as set forth in claim 12, wherein the look-up table is tiled.

14. The processor as set forth in claim 10, wherein the merge weight is applied based upon a threshold function of the activity index.

15. The processor as set forth in claim 10, wherein the merge weight is applied based upon a linear function of the activity index.

16. The processor as set forth in claim 10, comprising multi-level means for multi-level halftoning the merged image.

17. The processor as set forth in claim 10, wherein the continuous-tone image is a color image.

18. A processor for halftoning a continuous-tone image to form a halftone image, the processor comprising:
   high frequency means for processing the continuous-tone image using a high frequency halftoning screen to form a high frequency continuously halftoned image;
   low frequency means for processing the continuous-tone image using a low frequency halftoning screen to form a low frequency continuously halftoned image; and
   merging means for forming a merged image by merging the high and low frequency continuously halftoned images based upon an activity index related to local change within the continuous-tone image, wherein the activity index is used to form an edge mask and the high and low frequency continuously halftoned images are merged to form a halftone hint mask.

* * * * *